United States Patent Office 3,708,503
Patented Jan. 2, 1973

3,708,503
A-HOMO-Δ'(10),2,4a(5)-3-SUBSTITUTED-ESTRATRIEN-4-ONES
Georg Anner, Basel, and Peter Wieland, Oberwil Basel-Land, Switzerland, assignors to Ciba-Geigy Corporation, Summit, N.J.
No Drawing. Filed Jan. 26, 1970, Ser. No. 5,898
Claims priority, application Switzerland, Jan. 30, 1969, 1,459/69; Dec. 22, 1969, 19,169/69
Int. Cl. C07d 13/04
U.S. Cl. 260—340.9    15 Claims

ABSTRACT OF THE DISCLOSURE

Compounds of the formula

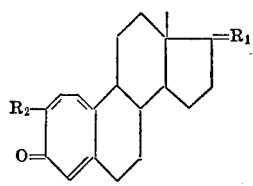

where $R_1$ is a free or ketalized oxo group or a β-positioned free, esterified or etherified hydroxy group together with a lower aliphatic saturated or unsaturated hydrocarbon residue, $R_2$ stands for an amino group or a free, esterified or etherified hydroxyl group, and the salts of the amino compounds.

Use as agents for fertility control.

---

The present invention provides steroid-tropones of the general formula

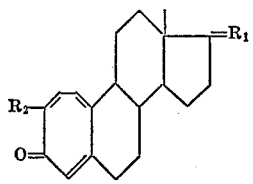

in which $R_1$ represents a free or ketalized oxo group, for example an ethylenedioxy group or a β-positioned free, esterified or etherified hydroxyl group together with a lower aliphatic saturated or unsaturated hydrocarbon residue and $R_2$ stands for an amino group or especially for a free, esterified or etherified hydroxyl group, and the salts of the amino compounds, as well as a process for their manufacture.

The new compounds are distinguished by their oestrogenic, antigonadotropic and spermicidal activity so that they can be used as oestrogenic or antigonadotropic agents and also for fertility control. Of special value are those compounds of the above formula in which $R_1$ represents an oxo group or a β-positioned hydroxy group together with a methyl or ethinyl group, and their esters with aliphatic, especially lower aliphatic, carboxylic acids such as their acetates. These compounds display, for example in the known Allen-Doisy test, a pronounced oestrogenic activity in a dose from 0.3 to 100 mg. per kg. bodyweight, and in the known ovulation test in doses of about 0.3 to 30 mg. per kg. bodyweight a change in the gonadotropic secretion. In the tests mentioned 17-ethinyl-17-hydroxy-3-amino-4-oxo-A-homo-19-nor-androsta-Δ1(10),2,4a-triene is specially active in doses from 0.3 to 1.0 mg. per kg. bodyweight. It acts also orally.

The 3-hydroxy-tropones, especially those of the above formula in which $R_2$ is a free hydroxyl group or a hydroxyl group esterified with a lower aliphatic carboxylic acid or etherified with a lower aliphatic alcohol, and $R_1$ represents an oxo group or a β-positioned hydroxy group together with a methyl or ethinyl group and their esters with aliphatic, especially lower aliphatic carboxylic acids, such as their acetates, have above all a spermicidal activity. For example, a dose of as little as 2×10 mg. s.c. of 3,17β-dihydroxy - 4 - oxo-17α-ethinyl-A-homo-19-nor-androsta-Δ1(10),2,4a-triene greatly accelerates the passage of the egg in rats. Moreover, a dose of 0.3–3 mg./kg. s.c. produces in female rats a uterine liquid which greatly influences the sperm motility in vitro. They may be used especially for fertility control.

On the other hand, the new compounds are also valuable intermediates which can be converted into other A-homo-steroids by known chemical and/or microbiological methods.

The esterified hydroxyl group in the compounds defined above is more especially a hydroxyl group that is esterified with an aliphatic, alicyclic, araliphatic or aromatic carboxylic acid containing at most 20 carbon atoms, for example with formic, methylcarbonic, acetic, trifluoracetic, trimethylacetic, propionic, caproic, decanoic, undecylenic, hexahydrobenzoic, cyclopentylpropionic, phenylpropionic, benzoic or furancarboxylic acid. An etherified hydroxyl group is especially one that is etherified with an aliphatic, cycoaliphatic, araliphatic or heterocyclic alcohol, for example with a tetrahydropyranyl or furanyl alcohol.

Suitable saturated or unsaturated lower aliphatic residues are, for example, lower alkyl, such as methyl, ethyl, propyl or isopropyl residues; lower alkenyl such as vinyl, allyl or methallyl residues, or lower alkinyl such as ethinyl or propionyl residues. The term "lower" as used above or further on in connection with hydrocarbon residues defines residues containing at most 5 carbon atoms.

The new steroid-tropones are manufactured in the known manner. Thus, a compound of the formula

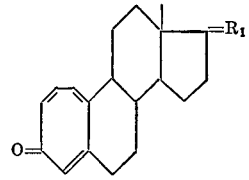

in which $R_1$ has the above meaning, can be reacted with hydrazine or with hydroxyl amine, or an ester or ether thereof.

Preferably, this reaction is carried out in an organic polar solvent, such as a lower alcohol, for example methanol or ethanol, if desired in admixture with tetrahydrofuran or dioxane, or in dimethylformamide.

The starting materials to be used are known or insofar as they are new they can be prepared by dehydrogenating a 4-oxo-19-nor-A-homo-androsta-1,5(10)-diene with an oxidant suitable for splitting α-glycols, for example periodic acid or an alkali or alkaline earth metal salt thereof.

The compounds obtained may be converted one into another, for example by reacting the tropones which have in 3-position a free, esterified or etherified hydroxyl group with ammonia or those which have an amino group in 3-position with a strong base, such as sodium- or potassium-hydroxide.

The reaction with ammonia is carried out in the usual manner, for example with liquid ammonia or with aqueous ammonia in an organic solvent, such as an alcohol, for example methanol, or ethanol. The reaction with strong bases is also performed in a manner known per se.

Any esterified or etherified hydroxyl groups or ketalized oxo groups present in the process products can, if desired, be split. A free oxo group in position 17 can be reduced with a metal derivative, especially a Grignard compound or an alkali metal, such as lithium or sodium, derivative of a lower aliphatic compound to form the 17α-substituted 17β-hydroxy compounds.

The invention includes also any variant of the process in which a starting material is formed in situ or is used in the form of a salt or other derivative, or in which an intermediate obtained at any stage is used as starting material and any remaining step(s) is/are carried out.

The present invention is also concerned with the manufacture of pharmaceutical preparations for use in human and veterinary medicine that contain the new pharmacologically active substances described above in conjunction or admixture with a pharmaceutical excipient. As excipients there are used organic or inorganic substances suitable for enteral, for example oral, parenteral or local administration. Suitable substances of this kind are those which do not react with the new compounds, for example water, gelatin, lactose, starches, magnesium stearate, talcum, vegetable oils, benzyl alcohols, gums, polyalkyleneglycols, white petroleum jelly, cholesterol or other known medicinal excipients. The pharmaceutical preparations may be in the solid form, for example tablets, dragees or capsules, or in liquid or semiliquid form, as solutions, suspensions, emulsions, ointments or creams. These pharmaceutical preparations may be stabilized and/or contain assistants such as preservatives, stabilizers, wetting agents or emulsifiers, salts for regulating the osmotic pressure or buffers. They may also contain further therapeutically valuable substances. The new compounds may also be used as starting materials for the manufacture of other valuable compounds.

The following non-limiting examples illustrate the invention.

EXAMPLE 1

A mixture of 23 g. of 4-oxo-17-ethylenedioxy-A-homo-$\Delta^{1(10),2,4a}$-19-nor-androstatriene, 230 ml. of ethanol and 23 ml. of 80% hydrazine hydrate is refluxed for 30 minutes under nitrogen. The cooled reaction solution is mixed with water and extracted with methylenechloride. The extract is washed with dilute sodium chloride solution, dried and evaporated and the residue is chromatographed on 1.1 kg. of silica gel. 3-Amino-4-oxo-17-ethylenedioxy-A-homo-$\Delta^{1(10),2,4a}$-19-norandrostatriene is eluted with a 1:1-mixture of toluene and ethyl acetate. After redissolution from a mixture of methylene chloride and ether 18.6 of a compound are obtained which after recrystallization from this mixture reveals in the ultraviolet region absorption maxima at 249, 339 and 395 m$\mu$ ($\epsilon$=33800, 14800 and 9800).

18.6 grams of the aminotropone obtained above are mixed with 600 ml. of 90% acetic acid and placed for one hour under nitrogen in a bath maintained at 80° C. The whole is then evaporated under vacuum and the residue dissolved in methylenechloride, washed with water, saturated sodium hydrogencarbonate solution and water, dried and once more evaporated under vacuum. Crystallization of the residue from methylenechloride+ether yields 13.84 g. of 3-amino-4,17-dioxo-A-homo-$\Delta^{1(10),2,4a}$-19-norandrostatriene which after another crystallization melts at 244–245° C.

EXAMPLE 2

58 ml. of a 3-molar solution of methyl-magnesium chloride in tetrahydrofuran is stirred into an ice-cooled solution of 4.32 g. of 3-amino-4,17-dioxo-A-homo-$\Delta^{1(10),2,4a}$-19-norandrostatriene in 90 ml. of absolute tetrahydrofuran. One hour later, while continuing the cooling, a saturated Seignette salt solution is added and the whole extracted with methylene chloride, washed with saturated Seignette salt solution, dried and evaporated under vacuum. Since, according to its infrared spectrum, the resulting crude product still contains some starting material it is once more treated with methyl-magnesium chloride as described above and then chromatographed on 215 g. of silica gel. The fractions eluted with a 1:1-mixture of toluene and ethyl acetate contain the 3-amino-4-oxo-17α-methyl - 17β - hydroxy-A-bromo-$\Delta^{1(10),2,4a}$-19-nor-androstatriene of which, after crystalliaztion from acetone, 2.74 g. are obtained. The infrared spectrum in methylene-chloride solution reveals characteristic bands at 2.75, 2.83, 2.90, 6.25, 6.30 and 6.60$\mu$.

EXAMPLE 3

While stirring at room temperature, acetylene is introduced during 30 minutes into 290 ml. of absolute tetrahydrofuran. Then, while continuing the introduction of acetylene, 360 ml. of an 0.36-molar solution of methylmagnesium chloride in tetrahydrofuran are run in within 13 minutes. 30 minutes later the acetylene stream is replaced by nitrogen and 3.6 g. of 3-amino-4,17-dioxo-A-homo-$\Delta^{1(10),2,4a}$-19-nor-androstatriene are added and flushing the whole for 2 hours at room temperature saturated Seignette salt solution is added while cooling and the whole is repeatedly extracted with methylenechloride. The organic solutions are washed with saturated Seignette salt solution, dried and evaporated under vacuum. Crystallization of the residue from a mixture of methylenechloride+methanol+ether furnishes 3.2 g. of 3-amino-4-oxo-17α-ethinyl-17β-hydroxy - A - homo-$\Delta^{1(10),2,4a}$-19-norandrostatriene which after having been recrystallized melts at 252 to 254° C.

EXAMPLE 4

A mixture of 693 mg. of 3-amino-4-oxo-17α-ethinyl-17β-hydroxy - A - homo-$\Delta^{1(10),2,4a}$-19-nor-androstatriene, 88 ml. of ethanol and 88 ml. of a 2 n-sodium hydroxide solution is boiled under nitrogen for 14 hours. The cooled reaction solution is mixed with a mixture of 14 ml. of acetic acid and 31 ml. of water, then poured into water and extracted several times with methylene chloride. The organic extract is washed with a dilute solution of sodium hydrogen carbonate and then with water, dried and evaporated under vacuum. The residue is chromatographed on 35 g. of silica gel. 3,17β-dihydroxy-4-oxo-17α-ethinyl-A-homo-$\Delta^{1(10),2,4a}$-19-nor-androstatriene is eluted with a 4:1-mixture of toluene and ethyl acetate. After crystallization from acetone it melts at 228–232.5° C.

EXAMPLE 5

1.5 g. of 3-amino-4-oxo-17α-methyl-17β-hydroxy-A-homo-$\Delta^{1(10),2,4a}$-19-nor-androstatriene are mixed with 190 ml. of ethanol and 190 ml. of a 2 n-solution of sodium hydroxide. The mixture is then refluxed for 14 hours under nitrogen. The cooled reaction solution is mixed with a mixture of 29 ml. of acetic acid and 67 ml. water and then poured into 1 litre water and extracted several times with methylene chloride. The organic extract is washed with a dilute solution of sodium hydrogen carbonate and then with water, dried and evaporated under vacuum. The residue is chromatographed on 75 g. of silica gel. 3,17β-dihydroxy - 4 - oxo-17α-methyl-A-homo-$\Delta^{1(10),2,4a}$-19-nor-androstatriene is eluted with 4:1-mixture of toluene and ethyl acetate. After recrystallization with methylene chloride and ether it melts at 206–207° C.

EXAMPLE 6

A mixture of 4 g. of 3-amino-4-oxo-17-ethylenedioxy-A-homo-$\Delta^{1(10),2,4a}$-19-nor-androstatriene, 500 ml. ethanol and 500 ml. of a 2 n-solution of sodium hydroxide is refluxed for 14 hours under nitrogen. Then a mixture of 75 ml. acetic acid and 175 ml. of water are added to the cooled solution and the whole poured into water, and extracted several times with methylene chloride. The organic extract is washed with a dilute solution of sodium hydrogen carbonate and with water, dried and evaporated under vacuum. The residue is chromatographed on 200 g. of silica gel. 3-hydroxy-4-oxo-17-ethylenedioxy-A-homo-$\Delta^{1(10),2,4a}$-19-nor-androstatriene is eluted with a 9:1-mixture of toluene and ethyl acetate. After recrystallization from methylene chloride and ether it melts at 143–144° C.

The compound obtained is heated for 15 minutes with 90% acetic acid to give the 3-hydroxy-4,17-dioxo-A-homo-$\Delta^{1(10),2,4a}$-19-nor-androstatriene, which after recrystallization from methylene chloride and ether melts at 184–185.5° C.

EXAMPLE 7

While stirring at room temperature, acetylene is introduced for 30 minutes into 175 ml. of tetrahydrofuran. Then, while continuing the introduction of acetylene, 220 ml. of an 0.36-molar solution of methyl-magnesium chloride in tetrahydrofuran are run in within 12 minutes. 30 minutes later the acetylene stream is replaced by nitrogen and 2.2 g. of 3-hydroxy-4,17-dioxo-A-homo-$\Delta^{1(10),2,4a}$-19-nor-androstatriene are added and flushing is performed with 11 ml. of tetrahydrofuran. 2 hours later 225 ml. of a saturated Seignette salt solution is slowly added while cooling with a mixture of ice and methanol. After diluting with water the whole is repeatedly extracted with methylene chloride. The organic solutions are washed with saturated Seignette salt solution, dried and evaporated under vacuum. By chromatography of the residue on 110 g. of silica gel there is isolated the 3,17β-dihydroxy-4-oxo-17α-ethinyl-A-homo-$\Delta^{1(10),2,4a}$-19-nor-androstatriene which is identical with that obtained according to Example 1.

EXAMPLE 8

To a solution of 2.15 g. of 3-hydroxy-4-oxo-17-ethylenedioxy-A-homo-$\Delta^{1(10),2,4a}$-19-nor-androstatriene in 100 ml. methylene chloride and 50 ml. methanol there are added at 0° C. 35 ml. of an 0.75 n-solution of diazomethane in ether. After being allowed to stand for 30 minutes at 0° C. the reaction mixture is evaporated under vacuum and the residue recrystallized repeatedly from methanol-methylene chloride-ether; the 3-oxo-4-methoxy-17-ethylenedioxy-A-homo-$\Delta^{1,4,5(10)}$-19-nor-androstatriene thus obtained melts at 233–237° C. From the residue of the evaporated mother-liquors a mixture of the above-described 4-methoxy-compound and the isomeric 3-methoxy-4-oxo-17-ethylenedioxy-A-homo-$\Delta^{1(10),2,4a}$-19-nor-androstatriene is obtained by recrystallization from methanol-methylene chloride-ether.

EXAMPLE 9

1.53 g. of 3,17β-dihydroxy-4-oxo-17α-ethinyl-A-homo-$\Delta^{1(10),2,4a}$-19-nor-androstatriene are dissolved in 75 ml. of methylene chloride and 37.5 ml. of methanol, and 25 ml. of an ethereal 0.75 n-solution of diazomethane is added at 0° C. After being allowed to stand at 0° C. for 30 minutes, the whole is evaporated under vacuum. The residue consists of a mixture of the 3-methoxy-4-oxo- and the 4-methoxy-3-oxo-17α-ethinyl-17β-hydroxy-A-homo-$\Delta^{1(10),2,4a}$-19-nor-androstatriene. Crystallization from methylene chloride+ether gives the 4-methoxy compound melting at 218–219.5° C.

900 mg. of the above mixture are dissolved in 90 ml. of ethanol, and 18 ml. of a 2 n-solution of sodium hydroxide is added under nitrogen. 17 hours later 9 ml. of acetic acid and methylene chloride are added and the whole washed with a sodium hydrogen carbonate solution and with water, dried and evaporated under vacuum. Chromatography of the residue on silica gel results in 3,17β-dihydroxy-4-oxo-17α-ethinyl-A-homo-$\Delta^{1(10),2,4a}$-19-nor-androstatriene.

EXAMPLE 10

To a solution of 2.61 g. of 3,17-dihydroxy-4-oxo-17α-methyl-A-homo-$\Delta^{1(10),2,4a}$-19-nor-androstatriene in 120 ml. methylene chloride and 60 ml. methanol are added at 0° C. 42.5 ml. of an 0.75 n-ethereal solution of diazomethane. After being allowed to stand for 30 minutes at 0° C. the whole is evaporated under vacuum and the residue crystallized from methylene chloride+ether. 3-oxo- 4-methoxy-17α-methyl - 17β - hydroxy-A-homo-$\Delta^{1,4,5(10)}$-19-nor-androstatriene melting at 221–233.5° C. are thus obtained. From the mother liquors the isomeric 3-methoxy - 4-oxo-17α-methyl-17β-hydroxy-A-homo-$\Delta^{1(10),2,4a}$-19-norandrostatriene may be obtained.

EXAMPLE 11

A mixture of 196 mg. of 3-methoxy-4-oxo-17-methylene-dioxy-A-homo-$\Delta^{1(10),2,4a}$-19-nor-androstatriene, 10 ml. of ethanol and 4 ml. of ammonia is heated at 95° C. for 14 hours in a sealed tube. The reaction mixture is then evaporated under reduced pressure and chromatographed on 10 g. of silica gel. The fractions eluted with a 1:1 toluene+ethyl acetate mixture are separated on silica gel plate 1 m. long, whereupon the main zone is eluted with ethyl acetate. The eluates are washed with water, dried and evaporated under reduced pressure, then chromatographed again on 6 g. of silica gel. There is obtained in this manner pure 3-amino-4-oxo-17-ethylenedioxy-A-homo-$\Delta^{1,4,5(10)}$-19-nor-androstatriene which is identical with the compound described in Example 1.

We claim:
1. A steroid-tropone of the formula

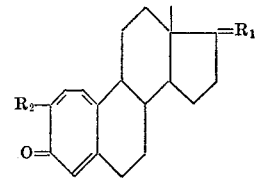

in which $R_1$ represents oxo, ethylenedioxy or β-positioned hydroxy together with a lower alkyl, lower alkenyl or lower alkinyl, and $R_2$ stands for amino, hydroxy or lower alkoxy.

2. A steroid-tropone as claimed in claim 1 of the formula

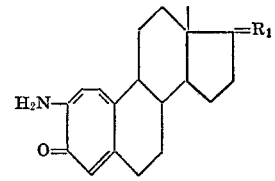

3. A steroid-tropone as claimed in claim 2 wherein $R_1$ represents oxo or β-positioned hydroxy together with methyl or ethinyl.

4. A steroid-tropone as claimed in claim 3, wherein $R_1$ represents β-hydroxy together with α-ethinyl.

5. A steroid-tropone as claimed in claim 2, wherein $R_1$ is ethylenedioxy.

6. A steroid-tropone as claimed in claim 3, wherein $R_1$ is oxo.

7. A steroid-tropone as claimed in claim 3, wherein $R_1$ represents β-hydroxy together with methyl.

8. A steroid-tropone as claimed in claim 1, wherein $R_2$ stands for hydroxyl, or lower alkoxy.

9. A steroid-tropone as claimed in claim 1, wherein $R_1$ is β-hydroxy together with α-ethinyl and $R_2$ is hydroxy.

10. A steroid-tropone as claimed in claim 1, wherein $R_1$ is β-hydroxy together with α-methyl and $R_2$ is hydroxy.

11. A steroid-tropone as claimed in claim 1, wherein $R_1$ is ethylenedioxy and $R_2$ is hydroxy.

12. A steroid-tropone as claimed in claim 1, wherein $R_1$ is oxo and $R_2$ is hydroxy.

13. A steroid-tropone as claimed in claim 1, wherein $R_1$ is ethylenedioxy and $R_2$ is methoxy.

14. A steroid-tropone as claimed in claim 1, wherein $R_1$ is $\beta$-hydroxy together with $\alpha$-ethinyl and $R_2$ is methoxy.

15. A steroid-tropone as claimed in claim 1, wherein $R_1$ is $\beta$-hydroxy together with $\alpha$-methyl and $R_2$ is methoxy.

References Cited

UNITED STATES PATENTS 3,412,108  1/1968  Birch _____ 260—586 X

ALEX MAZEL, Primary Examiner

J. H. TURNIPSEED, Assistant Examiner

U.S. Cl. X.R.

260—345.8, 345.9, 347.4, 488 B, 563 A, 586 H; 424—278